United States Patent [19]

Kohno

[11] 4,405,095
[45] Sep. 20, 1983

[54] MAGNETIC TAPE SHIFTING DEVICE

[75] Inventor: Tsutomu Kohno, Yokohama, Japan

[73] Assignee: Victor Company of Japan, Limited, Yokohama, Japan

[21] Appl. No.: 280,083

[22] Filed: Jul. 2, 1981

[30] Foreign Application Priority Data

Jul. 4, 1980 [JP] Japan .............................. 55-93653[U]

[51] Int. Cl.³ .......................... G03B 1/04; G11B 15/32
[52] U.S. Cl. ..................................... 242/179; 242/186
[58] Field of Search ............................... 242/179–180, 242/186–190, 201–205; 360/96.5, 96.6, 132, 93, 94; 40/515, 516

[56] References Cited
U.S. PATENT DOCUMENTS 3,168,993  2/1965  Mathieu .............................. 242/180

Primary Examiner—Leonard D. Christian
Attorney, Agent, or Firm—Lowe, King, Price & Becker

[57] ABSTRACT

A magnetic tape shifting device comprises a movable member for carrying a plurality of reels and a driving mechanism for moving the movable member so that a desired reel carried by the movable member comes to a given position on a stationary member of the device. The movable member may comprise a rotatable member or a slidable member for carrying a plurality of payoff reels and/or takeup reels. The end of running magnetic tape may be detected by a photo detector for energizing a motor or motors which drive the movable member so that next reel will come to the given position immediately after the end of the operation of the former magnetic tape. The device according to the present invention may be applied to a tape recorder which produces a number of tapes by copying from an original or master tape, and time required for copying a number of tapes can be remarkably reduced because exchange of reels can be performed during operation of a magnetic tape of other reel.

11 Claims, 5 Drawing Figures

MAGNETIC TAPE SHIFTING DEVICE

BACKGROUND OF THE INVENTION

This invention relates generally to devices for shifting a magnetic tape wound around an open-type reel to another.

In various magnetic recording and/or reproducing devices, such as a tape recorder, the magnetic recording tape wound around a payoff reel is reeled around a takeup reel after scanned by a magnetic head or heads. However, in conventional devices of this sort, only a single payoff reel and a single takeup reel can be mounted. Namely, conventional tape operating devices comprise only two reel mounts for a payoff reel and for a takeup reel. Therefore, when intended to change the magnetic tapes from one to another, at least one of the reels has to be detached before another reel with a magnetic tape is mounted. Especially, when producing a number of magnetic tapes by copying from an original or master tape, the work of exchanging tape reels is time consuming, and it has been desired to reduce the time for exchanging the reels. Furthermore, when reproducing a piece of music or speech of relatively long duration, having been recorded on a plurality of magnetic tapes mounted on separate reels, the music or speech had to be interrupted for a relatively long period of time with conventional tape recorders, because it takes a given period time for exchanging the reels.

SUMMARY OF THE INVENTION

The present invention has been developed in order to remove the above-mentioned disadvantages inherent to conventional tape recording and/or reproducing apparatus or magnetic tape reeling apparatus.

It is, therefore, an object of the present invention to provide a new and useful magnetic tape shifting device with which a plurality of magnetic tapes wound around a plurality of separate reels can be reeled one after another within a short period of time.

Another object of the present invention is to provide a tape recorder having such a magnetic tape shifting device so that recording and/or playback is interrupted for a relatively short period of time when exchanging reels.

In accordance with the present invention, there is provided a magnetic tape shifting device for reeling a plurality of magnetic tapes separately wound around a plurality of reels, comprising: (a) first means for carrying a plurality of reels; and (b) second means for moving said first means so that a given position of said first means is moved to a predetermined position with respect to a stationary member of said device.

BRIEF DESCRIPTION OF THE DRAWINGS

These and other objects and features of the present invention will become more readily apparent from the following detailed description of the preferred embodiments taken in conjunction with the accompanying drawings in which.

The same or corresponding elements and parts are designated at like numerals throughout the drawings.

DETAILED DESCRIPTION OF THE PREFERRED EMBODIMENTS

Figure 1:
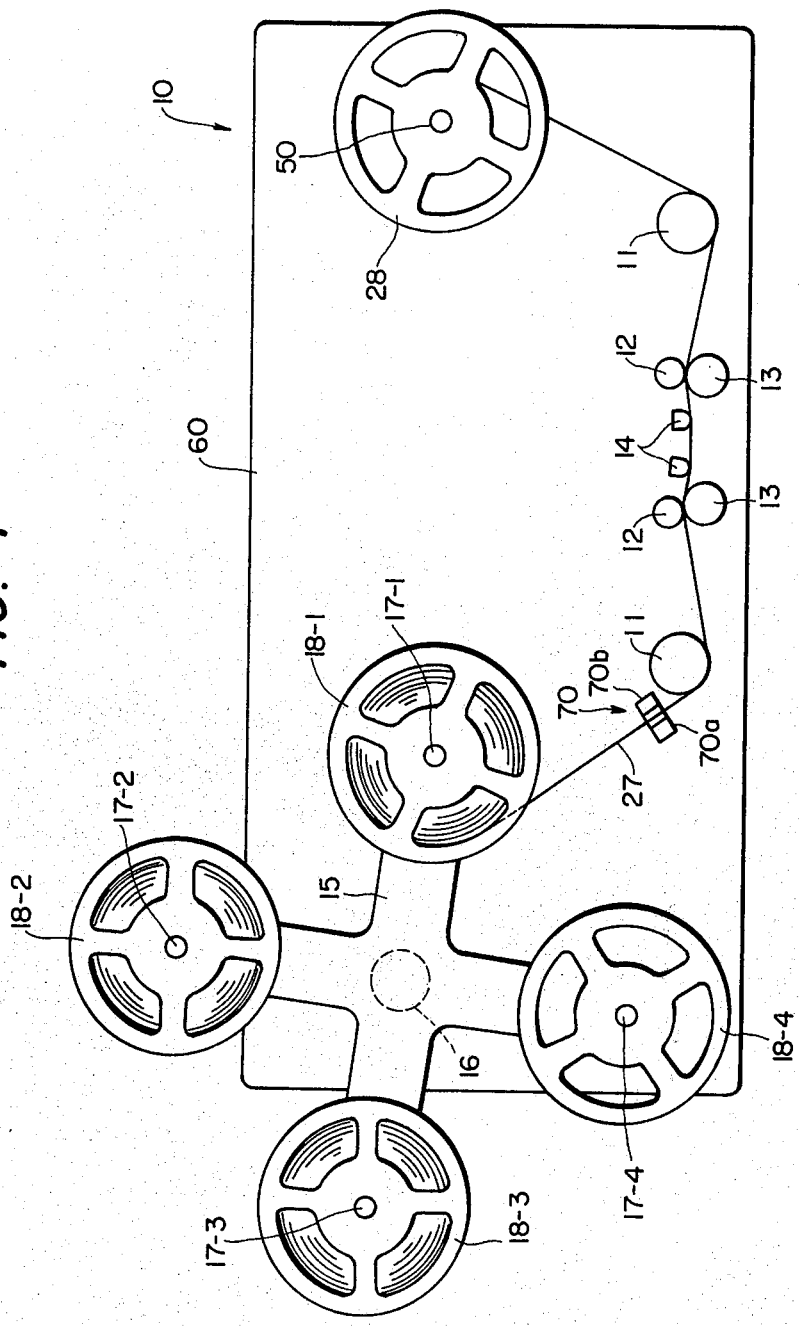
FIG. 1 is a schematic top plan view of a first embodiment of the magnetic tape shifting device according to the present invention.

Referring to FIG. 1 illustrating a top plan view of the first embodiment of the present invention, a tape recorder is generally designated by reference numeral 10. Although the embodiments of the tape shifting device according to the present invention will be described in connection with a tape recorder, the device according to the present invention may be adapted to various magnetic tape recording and/or reproducing devices as well as to a magnetic tape reeling or shifting device having no recording or reproducing function.

Tape recorder 10 comprises guide rollers 11, capstans 12, pinch rollers 13, magnetic heads 14 in the same manner as conventional tape recorders. Although tape recorder 10 has a single rotary shaft 50 for driving a takeup reel 28, the tape recorder also has a rotary member 15 for carrying a plurality of payoff reels 18-1 to 18-4. As shown, the number of payoff reels 18-1 to 18-4 in this embodiment is four. Rotary member 15 is X-fashioned, and is rotatably mounted on a stationary member 60 of tape recorder 10. Namely, rotary member 15 has a plurality of arms radially extending from the center of rotation. Payoff reels 18-1 to 18-4 are respectively mounted at tip portions of the arms of X-fashioned rotary member 15 in such a manner that each of payoff reels 18-1 to 18-4 is rotatable with respect to the X-fashioned rotary member.

Figure 2:
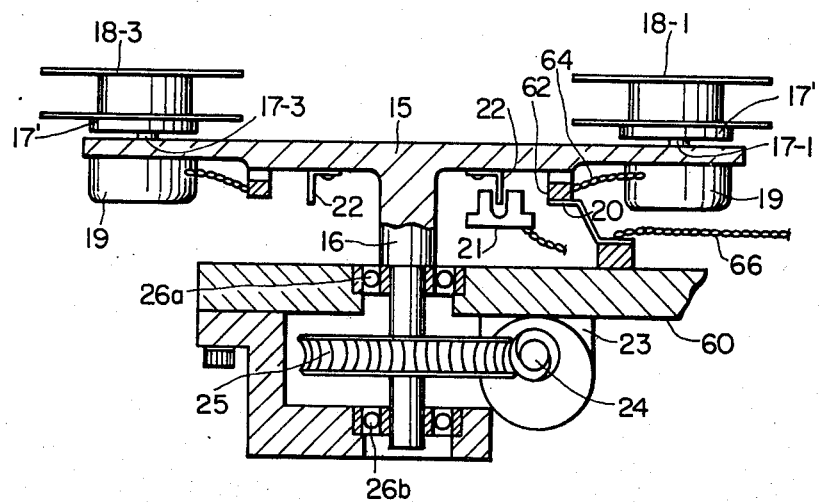
FIG. 2 is a partial cross-sectional view of the device of FIG. 1.

As best seen in a cross-sectional view of FIG. 2, each arm of X-fashioned rotary member 15 comprises a reel shaft driving motor 19. In detail, each reel-driving motor 19 is attached to the lower surface of each arm so that the motor shaft thereof penetrates through a through-hole made in the arm, and a reel mount 17' is fixedly connected to the motor shaft at the upper surface side of each arm. Each of reel mounts 17' comprises a reel shaft 17-1, 17-2, 17-3 or 17-4.

X-fashioned rotary member 15 has a rotary shaft 16, at the intersection of the arms thereof, and rotary shaft 16 extends downward, namely, in the direction perpendicular to X-fashioned rotary member 15. Rotary shaft 16 is supported by means of a ball bearing mechanism 26a so that the X-fashioned rotary member 15 is rotatable with respect to stationary member 60. Rotary shaft 16 further extends, and is fixedly connected to a geared wheel 25 so that the rotary shaft functions as the shaft of geared wheel 25. A lower portion of rotary shaft 16 is received by another ball bearing mechanism 26b interposed between the rotary shaft and stationary member 60. The teeth of geared wheel 25 are engaged with a worm gear 24 connected to a shaft of a motor 23 secured on the lower surface of stationary member 60.

Each arm of X-fashioned rotary member 15 has a contact portion 62 having two conductive portions insulated from each other. The conductive portions are respectively connected via lead wires 64 to reel-driving motor 19 attached to the arm. Each contact portion 62 is located at the lower surface side of X-fashioned rotary member 15, and is rotatable together with the X-fashioned rotary member. On the other hand, a stationary contact member 20 having two conductive portions is fixedly attached to stationary member 60 in such a manner that the two conductive portions thereof are contactable with the above-mentioned conductive portions of contact portion 62 of each arm. The conductive portions of stationary contact member 20 are respectively connected via lead wires 66 and via a suitable switching circuit to a power supply. Namely, each of the contact portions 62 and stationary contact portion 20 functions as a switch for selectively energizing one of the four reel-driving motors 19.

Each arm of X-fashioned rotary member 15 further comprises a light-shielding member 22 which is attached to the lower surface of each arm. A photo detecting device 21, including a light-emitting element and a light-receiving element is stationarily provided so that the light beam from the light-emitting element is blocked by light-shielding member 22 when the light-shielding member moves across the passage of the light beam. The combination of light-shielding member 22 and photo detecting device 21 will be used for controlling the operation of motor 23, and therefore the rotational angle or position of X-fashioned rotary member 15 will be controlled as will be described hereinafter.

Turning back to FIG. 1, another photo detector 70 is positioned in the vicinity of the passage of magnetic tape 27. Photo detector 70 also comprises a light-emitting element 70a and a light-receiving element 70b. Elements 70a and 70b are arranged so that the light beam from light-emitting element 70a is blocked by magnetic tape 27 running between one of payoff reels 18-1 to 18-4 and takeup reel 28. Accordingly, as long as magnetic tape 27 is operated on tape recorder 10, no light-beam is received by light-receiving element 70b.

Figure 3:
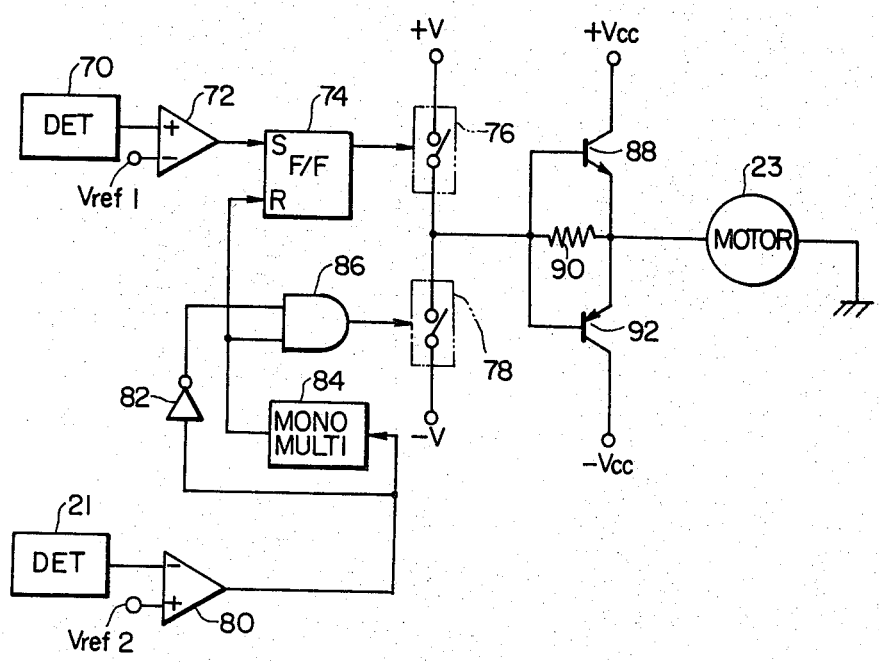
FIG. 3 is a circuit diagram of a control circuit for controlling the operation of the device of FIGS. 1 and 2.

Reference is now made to FIG. 3 which is a circuit diagram of a control circuit. The control circuit is responsive to an output signal from light-receiving element 70b of photo detector 70 and to an output signal from the other light-receiving element of photo detector 21, and comprises first and second comparators 72 and 80, a flip-flop 74, first and second analog switches 76 and 78, an inverter 82, a monostable multivibrator 84, an AND gate 86, a resistor 90, and first and second switching transistors 88 and 92, which are complementary to each other. First and second comparators 72 and 80 are respectively responsive to the output signals from photo detectors 70 and 21 for comparing the signal levels with thresholds defined by reference voltages Vref1 and Vref2. The output terminal of first comparator 72 is connected to a set terminal S of flip-flop 74. One output terminal of flip-flop 74 is connected to first analog switch 76 which selectively transmits a positive voltage +V therethrough in response to the output signal of the flip-flop. The output terminal of second comparator 80 is connected via inverter 82 to an input terminal of AND gate 86, and is also connected via monostable multivibrator 84 to a second input terminal of the AND gate. The output terminal of monostable multivibrator 84 is connected to a reset terminal R of flip-flop 74. The output terminal of the AND gate 86 is connected to second analog switch 78 which selectively transmits a negative voltage —V in response to the output signal of AND gate 86. First and second analog switches 76 and 78 are connected to each other, and are further connected to bases of first and second transistors 88 and 92. The collector of first transistor 88 is connected to a positive power supply +Vcc, while collector of the second transistor 92 is connected to a negative power supply —Vcc. The emitters of first and second transistors 88 and 92 are connected to each other, and are further connected via resistor 90 to the bases thereof. A junction connecting emitters of the first and second transistors 88 and 92 is further connected to the driving coil (not shown) of motor 23 of FIG. 2.

The first embodiment magnetic tape shifting device operates as follows. It is assumed that magnetic tape 27, which was wound around payoff reel 18-1, has been completely reeled by takeup reel 28. As soon as the end of tape 27 passes photo detector 70, light-receiving element 70b thereof emits a high level output signal causing first comparator 72 to produce a high level signal. The high level signal from first comparator 72 is fed to set terminal S of flip-flop 74 so that flip-flop 74 starts producing a high level signal. As a result, first analog switch 76 closes to supply transistors 88 and 92 with a positive bias voltage. Thus, only first transistor 88 turns on, causing an electrical current to flow through its collector-emitter path into motor 23. Motor 23 is thus energized to rotate X-fashioned rotary member 15 in a given direction, for instance, clockwise in FIG. 1. Therefore, second payoff reel 18-2 approaches the position previously occupied by first reel 18-1. When the arm carrying second reel 18-2 assumes a given angle, light-shielding member 22 blocks the light beam of photo detector 21. Second comparator 80 thus produces a high level output signal, and monostable multivibrator 84 produces a pulse signal of a given width. The pulse from monostable multivibrator 84 is fed to reset terminal R of flip-flop 74 so that the output level of flip-flop 74 becomes low. As a result, first analog switch 76 turns off, and therefore, motor 23 will be deenergized to stop the rotational movement of X-fashioned rotary member 15.

In the above-described stopping operation, X-fashioned rotary member 15 is not necessarily stopped at a right position due to the moment of inertia. In other words, X-fashioned rotary member 15 has a chance to be excessively rotated beyond a given position or angle. In this case, light-shielding member 22 instantaneously blocks the light beam of photo detector 21, and then stops at a position where the light beam is not blocked. As a result, the output level of second comparator 80 becomes low again. The low level signal from second comparator 80 is inverted into a high level signal by inverter 82 to be fed to AND gate 86. At this time, the output signal level of monostable multivibrator 84 is still high, and therefore, a high level signal is applied from AND gate 86 to second analog switch 78. Second analog switch 78 thus closes to supply the negative bias voltage to first and second transistors 88 and 92. Accordingly, only second transistor 92 becomes conductive, allowing an electric current to flow from ground into motor 23. Namely, worm gear 24 rotates in the reverse direction, causing X-fashioned rotary member 15 to rotate counterclockwise in FIG. 1. When light-shielding member 22 is again detected, the output level of second comparator 80 turns high again, and therefore, a low level signal is applied from inverter 82 to AND gate 82. As a result, second analog switch 78 is opened to deenergize motor 23. Since the rotational angle in the counterclockwise direction is small, the rotational speed of X-fashioned rotary member 15 is much smaller than in clockwise rotation. Therefore, X-fashioned rotary member 15 can be accurately stopped by detecting light-shielding member 22 again.

After second reel 18-2 is positioned at a right position, the tape thereof will be reeled by a new takeup reel 28. At this time, first reel 18-1 is empty, and therefore, the empty first reel may be replaced with another reel with a magnetic tape during the operation of the tape supplied from second reel 18-2. In this way, a number of reeled tapes can be operated, namely, recorded, reproduced or simply reeled without recording or playing, one after another. Since disengagement of reels from the tape recorder can be performed during operation of another tape, and since preparation of subsequent tapes can also be done at the same time, length of time required for exchanging a number of reels is remarkably reduced compared to the conventional way with a tape recorder having only a single payoff reel and a single takeup reel.

In the above-described first embodiment, although a single takeup reel is employed, a plurality of takeup reels may be mounted in the same manner as the plurality of payoff reels 18-1 to 18-4 if desired.

Figure 4:
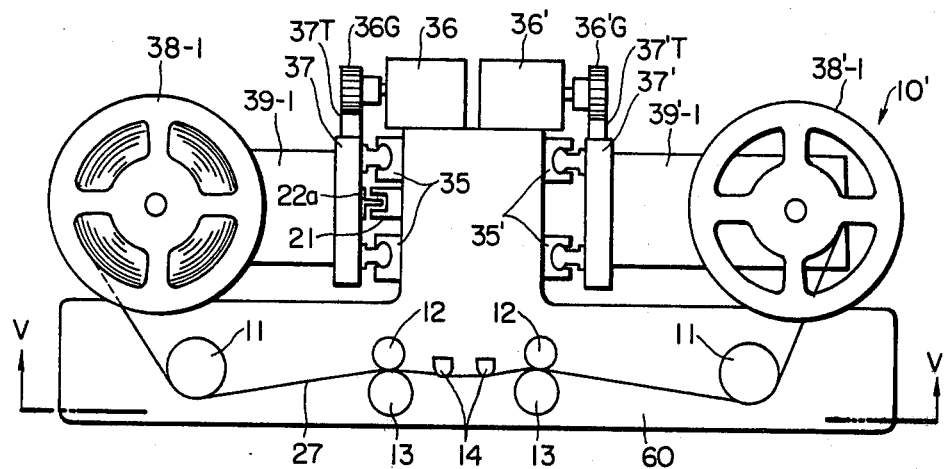
FIG. 4 is a schematic top plan view of a second embodiment of the magnetic tape shifting device according to the present invention.
Figure 5:
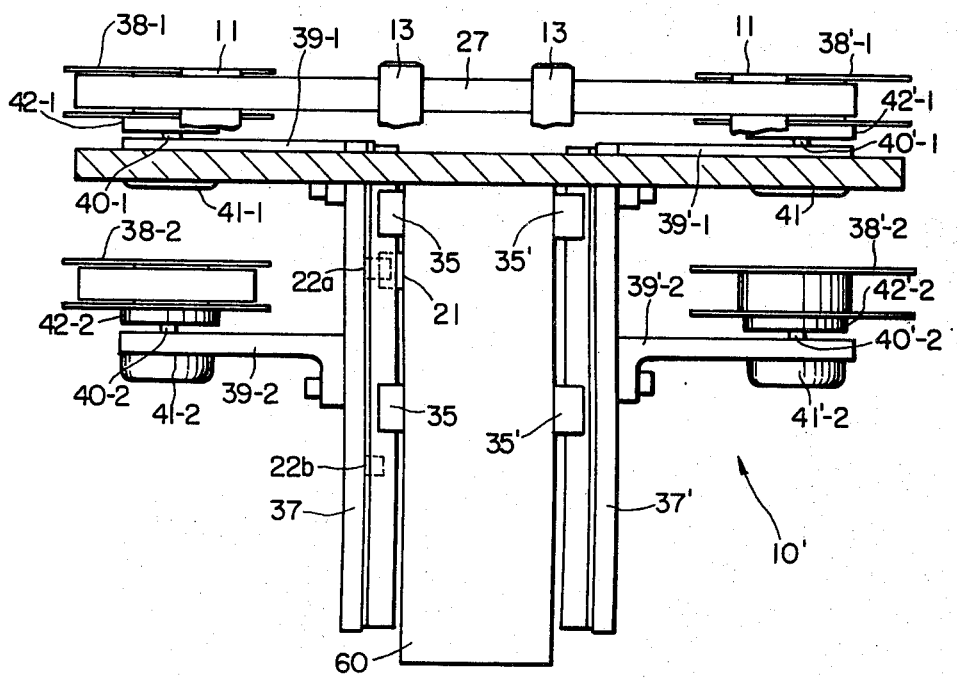
FIG. 5 is a partial cross-sectional view of the device of FIG. 4.

Reference is now made to FIGS. 4 and 5 which show the second embodiment of the present invention. FIG. 4 is a top plan view and FIG. 5 is a cross-sectional view taken along the line V—V of FIG. 4. A tape recorder is generally designated at a reference 10', and comprises a stationary member 60, guide rollers 11, capstans 12, pinch rollers 13 and magnetic heads 14 in the same manner as in the first embodiment. The second embodiment differs from the first embodiment in the arrangement of reels. Tape recorder 10' comprises a pair of linear movement bearings 35 and 35' attached to stationary member 60 and a pair of movable members 37 and 37' which are slidably attached by linear movement bearings 35 and 35' to the stationary member. A pair of driving motors 36 and 36' are provided for driving movable or slidable members 37 and 37' respectively. In detail, a geared wheel 36G and 36'G connected to the shaft of each of driving motors 36 and 36' is arranged to be engaged with a toothed portion 37T and 37'T of slidable members 37 and 37'. With this arrangement, rotation of driving motors 36 and 36' causes slidable members 37 and 37' to move up and down depending on the direction of the rotation. As best seen in FIG. 5, a plurality of arms 39-1 and 39-2 are attached to slidable member 37 by means of screws. Similarly, a plurality of arms 39'-1 and 39'-2 are attached to the other slidable member 37'. These arms 39-1, 39-2, 39'-1 and 39'-2 correspond to the arms of X-fashioned rotary member 15 of the first embodiment. Namely, each arm is equipped with a reel-driving motor 41-1, 41-2, 41'-1 and 41'-2 and reel mounts 42-1, 42-2, 42'-1 and 42'-2 which are attached to each arm in the same manner as in the first embodiment. Each of reel mounts 42-1, 42-2, 42'-1 and 42'-2 comprises a reel shaft 40-1, 40-2, 40'-1 and 40'-2. Arms 39-1 and 39-2 are parallel to each other and are perpendicular to the slidable member 37. The other pair of arms 39'-1 and 39'-2 are also attached to the other slidable member 37' in the same manner.

In FIG. 5, four reels 38-1, 38-2, 38'-1 and 38'-2 are shown to be carried. Reels 38-1 and 38-2 which are located at the left in FIG. 5 are payoff reels, while remaining reels 38'-1 and 38'-2 of right side are takeup reels. From the above, it will be understood that reels 38-1, 38-2, 38'-1 and 38'-1 can be moved vertically with respect to the top surface of the stationary member 60 by energizing driving motors 36 and 36'.

Two light-shielding members 22 are attached to slidable member 37 (see FIGS. 4 and 5), and a photo detector 21 having the same structure as that of the first embodiment is attached to stationary member 60. Each of reel-driving motors 41-1, 41-2, 41'-1 and 41'-2 is arranged to receive electrical power via a pair of lead wires, which are not shown for simplicity, and the lead wires are connected to corresponding slide contacts (not shown). With this arrangement, when payoff reel 38-1 on reel mount 40-1 and takeup reel 38'-1 on reel mount 40'1 are in positions so that tape 27 of payoff reel 38-1 can be engaged with magnetic heads 14, only reel-driving motors 41-1 and 41'-1 are energized to drive corresponding reels 38-1 and 38'-1.

The second embodiment magnetic tape shifting device operates in the same manner as the first embodiment except that not only payoff reels 38-1 and 38-2 but also takeup reels 38'-1 and 38'-2 are moved in the second embodiment. The control circuit of FIG. 3 may also be used, with a slight change, for controlling the operation of the second embodiment. Namely, when the end of magnetic tape 27 of upper payoff reel 38-1 is detected by photo detector 70, motors 36 and 36, which correspond to single motor 23 of the first embodiment, are both energized to move or shift slidable members 37 and 37' upward. When one of light-shielding members 22 blocks the light beam of photo detector 21, motors 36 and 36' are deenergized. At this time, payoff reel 38-2 and takeup reel 38'-2, which are respectively located below the payoff reel 38-1 and takeup reel 38'-1, have been raised vertically so that these reels 38-2 and 38'-2 take the positions where reels 38-1 and 38'-1 were. Then the magnetic tape of lower payoff reel 38-2 may be used for recording or playback, and may be reeled by lower takeup reel 38'-2. During the operation of the tape of lower payoff reel 38-2, the upper payoff reel 38-1 and upper takeup reel 38'-1 may be removed or exchanged with another respectively.

In the above-described second embodiment, although only two payoff reels 38-1 and 38-2 and only two takeup reels 38'-1 and 38'-2 are provided, the number of reels may be increased if desired. Furthermore, although all the reels are moved vertically with respect to the top surface of the stationary member, namely, the reels are moved vertically with respect to the planes of the reels in the second embodiment, the arrangement of the tape shifting device may be modified so that the reels are moved horizontally. In addition, the reels may be rotated along a circle in such a manner that the plane of each reel is perpendicular to the circle.

From the foregoing description, it will be understood that according to the present invention reel mounts for carrying payoff reels and/or takeup reels are moved so that a given reel on a corresponding reel mount is placed at a given position in a tape operating device. Since movement of the reels is started as soon as the tape end is detected, interval between the end of the operation of a magnetic tape and the beginning of the operation of another magnetic tape is very short. Moreover, with the provision of means for detecting the position of the reel mounts the reels are accurately placed after being moved. The above-described embodiments are just examples of the present invention, and therefore, it will be apparent for those skilled in the art that many modifications and variations may be made without departing from the spirit of the present invention.

What is claimed is:

1. A magnetic tape shifting device for reeling a plurality of magnetic tapes separately wound around a plurality of reels, comprising,
   (a) first means for carrying a plurality of reels, and having a rotary member for rotating said plurality of reels in a direction parallel to the plane of said reels; and
   (b) second means for moving said first means so that a given position of said first means is moved to a predetermined position with respect to a stationary member of said device.

2. A magnetic tape shifting device as claimed in claim 1, wherein said rotary member comprises a plurality of arms radially extending from the center of rotation.

3. A magnetic tape shifting device for reeling a plurality of magnetic tapes separately wound around a plurality of reels, comprising,
   (a) first means for carrying a plurality of reels, and having a slidable member for moving said plurality of reels in a direction perpendicular to the plane of said reels; and
   (b) second means for moving said first means so that a given position of said first means is moved to a predetermined position with respect to a stationary member of said device.

4. A magnetic tape shifting device as claimed in claim 3, wherein said slidable member comprises a plurality of arms arranged in parallel to each other.

5. A magnetic tape shifting device as claimed in claim 3 or 4, wherein each of said arms is equipped with a reel mount and a reel-driving motor.

6. A magnetic tape shifting device as claimed in claim 1, further comprising means for detecting the end of a magnetic tape operated by said magnetic tape shifting device.

7. A magnetic tape shifting device as claimed in claim 1, further comprising means for detecting the position of said first means.

8. A magnetic tape shifting device as claimed in claim 5, further comprising:
   (a) third means for detecting the end of a magnetic tape operated by said magnetic tape shifting device;
   (b) fourth means for detecting the position of said first means; and
   (c) a control circuit for energizing at least one driving motor of said second means in response to a signal from said third means and for deenergizing the same in response to a signal from said fouth means.

9. A magnetic tape shifting device as claimed in claim 8, wherein said control circuit further comprises means for detecting whether said first means is in a given position or not, and means for reenergizing said driving motor of said second means for correcting the position of said second means.

10. A magnetic tape shifting device for reeling a plurality of magnetic tapes separately wound around a plurality of payoff reels, comprising:
    (a) a rotary member having a plurality of arms radially extending from the center of rotation, each of said arms being equipped with a reel mount and a reel-driving motor;
    (b) first means for rotating said rotary member in a direction parallel to the plane of said plurality of payoff reels carried by said arms so that a given position of said rotary member is moved to a predetermined position with respect to a stationary member of said device, said first means having a motor operatively connected to a rotary shaft connected to said arms;
    (c) a magnetic tape guiding mechanism for guiding a magnetic tape from one of said plurality of payoff reels to a takeup reel;
    (d) second means for detecting the end of said magnetic tape supplied from said payoff reel;
    (e) third means for detecting the position of each of said arms of said rotary member; and
    (f) a control circuit responsive to signals from said second and third means for energizing said motor of said first means, and for deenergizing the same for stopping said rotary member at a desired position.

11. A magnetic tape shifting device for reeling a plurality of magnetic tapes separately wound around a plurality of payoff reels by a plurality of takeup reels, comprising:
    (a) first and second slidable members each having a plurality of arms arranged in parallel to each other, each of said arms of said first slidable member being equipped with a reel mount for carrying a payoff reel and with a reel-driving motor for driving said payoff reel, each of said arms of said second slidable member being equipped with a reel mount for carrying a takeup reel and with a reel-driving motor for driving said takeup reel;
    (b) first means for linearly moving said first and second slidable members in a direction perpendicular to the plane of said plurality of payoff reels and takeup reels respectively carried by said arms so that a given position of each of said first and second slidable members is moved to a predetermined position with respect to a stationary member of said device, said means having at least one motor operatively connected to said first and second slidable members;
    (c) a magnetic tape guiding mechanism for guiding a magnetic tape from one of said plurality of payoff reels to one of said plurality of takeup reels;
    (d) second means for detecting the end of said magnetic tape supplied from said payoff reel;
    (e) third means for detecting the position of each arm of at least one of said first and second slidable members; and
    (f) a control circuit responsive to signals from said second and third means for energizing said motor connected to said first and second slidable members when the end of said magnetic tape is detected and for deenergizing said motor for stopping each of said first and second slidable members at a desired position.

* * * * *